W. E. OVERTON.
PROCESS OF EXTRACTING OIL FROM FISH.
APPLICATION FILED JULY 25, 1911.
1,080,294.
Patented Dec. 2, 1913.
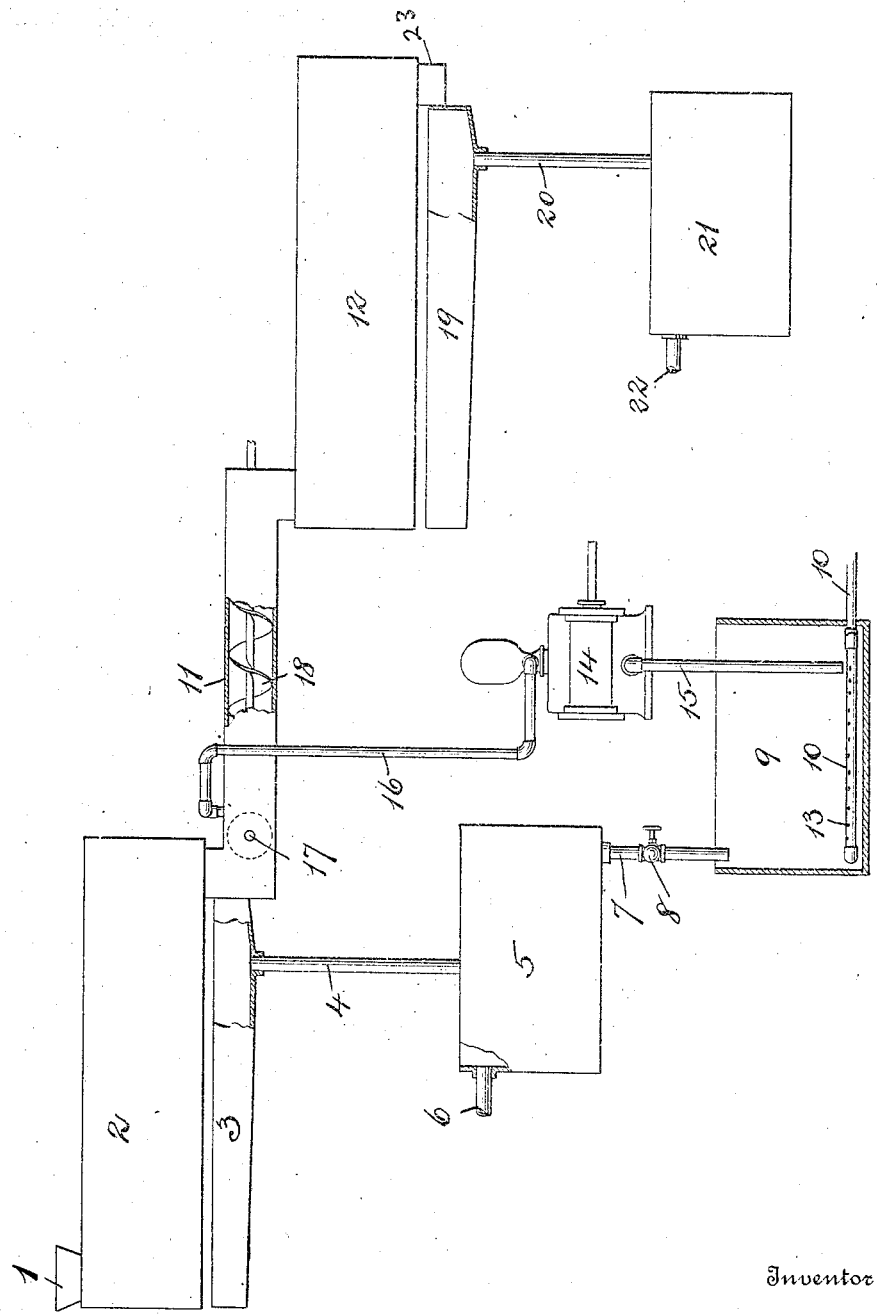
Witnesses
Edwin L. Bradford
G. Ferd. Vogt
Inventor
Willis E. Overton
By
Mann & Co.
Attorneys.

UNITED STATES PATENT OFFICE.

WILLIS E. OVERTON, OF SOLOMONS, MARYLAND.

PROCESS OF EXTRACTING OIL FROM FISH.

1,080,294. Specification of Letters Patent. Patented Dec. 2, 1913.

Application filed July 25, 1911. Serial No. 640,530.

*To all whom it may concern:*

Be it known that I, WILLIS E. OVERTON, a citizen of the United States, residing at Solomons, in the county of Calvert and State of Maryland, have invented certain new and useful Improvements in Processes for Extracting Oil from Fish, of which the following is a specification.

This invention relates to an improved process of extracting the oil and water from fish or other material.

It is common at the present time to subject large quantities of fish to a cooking or steaming action and to then pass the cooked or steamed fish through a press to extract the oil and water therefrom,—the oil being refined and the scrap utilized as a fertilizer.

The present mode of treating fish does not result in the procurement of as much oil as should be obtained and I am also aware that in subjecting the cooked or steamed fish to the action of a press that a very considerable quantity of the meat is pressed out with the oil and water and is lost with the water, which latter is run off after the oil has been separated therefrom.

The tendency today in the treatment of fish is to employ continuously-operating machines so that both the cooking and pressing operations may be carried on continuously and to do this screw-conveyer cookers and screw presses are employed. The screw-presses act to compress the fish to squeeze out the liquids and at the same time feed the mass forward to a point of discharge, and I have observed in the course of my long experience in the practical conduct of the business that while the oil and water near the outer surface of compressed mass are pretty well extracted there nevertheless remains in the central portions of said mass a considerable quantity of oil and water that passes out with the mass at the discharge end of the press. It is during this squeezing operation that fibers and stringy parts of the fish-meat are pressed out with the oil and water and are lost.

By my process I am enabled to obtain practically all of the oil the fish contain and I avoid the great loss of meat that has heretofore been expressed with the oil and water.

In carrying out my invention I may employ any suitable form of press but prefer to make use of a press similar to that shown in the U. S. Patent 975,990 granted on the 15th day of November 1910.

The accompanying drawing illustrates diagrammatically one arrangement of apparatus that will enable those skilled in the art to practise the invention, in connection with the disclosures made in the following specification.

After the fish have been properly steamed or cooked, which will be effected in any suitable apparatus not illustrated in the drawing, they, the fish, will be fed into the hopper, 1, at the inlet end of a press, 2, the latter also being of any preferred construction, when the oil and water will be pressed therefrom. The casing of this press, 1, is preferably open at the bottom so that the matter squeezed therefrom may escape and be caught in a suitable receptacle, 3, from which a drain pipe, 4, will convey and deposit it into a tank, 5. The matter collected in this tank consists of water, oil and fibrous particles of the fish meat which is expelled from the press with the oil and watery matter. Near the upper end the tank, 5, is provided with an overflow pipe, 6, which is designed to carry off the oil that rises to the surface while a pipe, 7, at the bottom of the tank serves to carry off the water and heavier particles whenever the valve, 8, is opened. A second tank, 9, is preferably provided to receive the heavier matter from the pipe, 7, and by preference this second tank is provided with a steam pipe, 10, near the bottom which may supply steam thereto and thus keep the contents of the tank in a heated condition. It will thus be understood that the substance deposited in tank, 9, will consist mainly of water and fibrous fish meat that has been squeezed from the mass passing through the press, 2, and as a matter of fact this substance contains a large quantity of the fish meat that at the present time is run off with the water and is lost. Ordinarily the fish that pass through the press, are compressed to extract so much of the oil and water as can be extracted simply by such an operation and the meat is then discharged.

By my improved process, I provide a conveyer casing, 11, which receives the pressed mass from the press, 2, and in which the mass will be loosened up and conveyed preferably to the feed-end of another press, 12, and during said breaking or loosening I propose to add water to the previously compressed mass which water will serve as a vehicle to carry off additional oil during a second compression which is to follow. In adding water to the previously-compressed, but now broken up or loosened mass, I find it of considerable advantage to utilize that water extracted from the fish in the first instance and which has been accumulated in the tank, 9, because that water also contains particles of fish meat which I desire to recover and which I keep in motion by agitation through the action of steam that enters the tank, 9, through perforations, 13, in steam pipe, 10. To convey the substance from tank, 9, I use a pump, 14,—a pipe, 15, leading from the tank to the pump, and a pipe, 16, serving to establish communication between the pump and the conveyer casing, 11. By means of the arrangement of devices thus described the watery substance from tank, 9, is thoroughly commingled with the mass from which it was previously expressed,—the oil however having been separated therefrom while in tank or receptacle, 5. In order to effect a thorough commingling of the materials in the casing, 11, I preferably utilize an agitator which is mounted on a shaft, 17, at the entrance-end of the said casing after which a screw conveyer, 18, will convey it to the feed-in-end of the press, 12.

While I have shown and preferably make use of a second press, it is to be understood that the material may be conveyed back to the feed-end of the press from which it came,—the object being to submit the previously-pressed material and added watery matter to a second pressing operation. By utilizing a second press however, I am enabled to make the operation a continuous one which obviously effects economics in commercially practising the invention. When the material from the conveyer casing, 11, enters the second press, 12, it is subjected to a second compression and during this operation inasmuch as the agitator has broken up the mass as it left the first press the oil left therein after the first pressing will now be expelled by pressure and also by the passage of the water from the interior to the exterior of the mass,—there being at this time a much greater proportion of water in the mass over the oil left therein and the latter will more readily pass off with the former and be deposited in a trough 19, from which it will pass off by pipe, 20, into a tank, 21. The oil expressed during this second compression will rise on the surface and may be drawn off by pipe, 22, while the fluid remaining may be disposed of in any suitable way. The material passing through press, 12, will be discharged through outlet pipe, 23, and removed in any suitable way.

It is to be understood that the present invention therefore seeks to express the oil and water from the heated fish; then separate the oil from the water; add water to the pressed material and then again subject the material to further pressure to express additional oil and water. In carrying out the process it is obvious that the material may be subjected to a third pressing if desired. It is obvious that the act of extracting the oil and water from the fish scrap results in effecting a partial drying of the mass.

Having thus described my invention what I claim and desire to secure by Letters Patent is,—

1. The process of extracting oil from fish consisting in subjecting a quantity of fish to a pressing operation to express oil and watery fluids therefrom, separating the oil from the watery fluid, returning the watery fluid to the mass and subjecting it to another pressing operation to express additional oil and the water and separating the oil from the water after the last pressing.

2. The process of extracting oil from fish consisting in subjecting a quantity of fish to a pressing operation to express oil and watery fluids therefrom, separating the expressed oil from the expressed watery fluid, loosening the pressed mass, returning the watery fluids to the loosened mass and again pressing the same to express additional oil and the water and finally separating the oil from the last expressed watery fluid.

3. The process of extracting oil from fish consisting in subjecting a quantity of fish to a pressing operation to express oil and watery fluids therefrom, separating the expressed oil from the expressed watery fluids, heating the watery fluids and return them to the pressed mass, again pressing the watered mass to express additional oil and the water and finally separating the oil from the last expressed watery fluid.

4. The process of extracting oil from fish consisting in subjecting a quantity of fish to a pressing operation to express oil and watery fluids therefrom, separating the expressed oil from the expressed watery fluids, heating the watery fluids and return them to the mass from which they came while agitating and loosening up the mass, again pressing the fish mass to express the water and enable the latter to act as a vehicle to carry off additional oil, and then separating the oil from the last expressed watery fluid.

In testimony whereof I affix my signature in presence of two witnesses.

WILLIS E. OVERTON.

Witnesses:
GEO. N. REED,
E. W. EDWARDS.